(12) United States Patent
Cui et al.

(10) Patent No.: US 11,573,216 B2
(45) Date of Patent: Feb. 7, 2023

(54) QUICK QUANTITATIVE ANALYSIS METHOD AND ANALYZER FOR MIXTURE BASED ON SPECTRAL INFORMATION

(71) Applicant: Henan Polytechnic University, Jiaozuo (CN)

(72) Inventors: Lizhi Cui, Jiaozuo (CN); Xuhui Pu, Jiaozuo (CN); Xinwei Li, Jiaozuo (CN); Keping Wang, Jiaozuo (CN); Yi Yang, Jiaozuo (CN); Bingfeng Li, Jiaozuo (CN); Qiongxia Yu, Jiaozuo (CN); Junqi Yang, Jiaozuo (CN); Fuzhong Wang, Jiaozuo (CN); Shumin Fei, Jiaozuo (CN)

(73) Assignee: Henan Polytechnic University, Jiaozuo (CN)

( * ) Notice: Subject to any disclaimer, the term of this patent is extended or adjusted under 35 U.S.C. 154(b) by 490 days.

(21) Appl. No.: 16/797,599

(22) Filed: Feb. 21, 2020

(65) Prior Publication Data

US 2020/0271630 A1    Aug. 27, 2020

(30) Foreign Application Priority Data

Feb. 22, 2019  (CN) .......................... 201910132432.0

(51) Int. Cl.
*G01N 30/88* (2006.01)
*G01N 30/36* (2006.01)

(52) U.S. Cl.
CPC ............. *G01N 30/88* (2013.01); *G01N 30/36* (2013.01)

(58) Field of Classification Search
CPC ............................... G01N 30/88; G01N 30/36
See application file for complete search history.

(56) References Cited

U.S. PATENT DOCUMENTS

| 2003/0124610 | A1* | 7/2003 | Kvalheim | .......... | G01N 30/8624 |
| | | | | | 435/7.1 |
| 2004/0046121 | A1* | 3/2004 | Golden | .................. | G01N 21/65 |
| | | | | | 356/301 |

* cited by examiner

*Primary Examiner* — Bryan Bui
(74) *Attorney, Agent, or Firm* — Hauptman Ham, LLP

(57) ABSTRACT

The present invention relates to a quick quantitative analysis method and analyzer for mixture concentration information. A quick quantitative analysis method for a mixture based on spectral information includes: collecting a sample of a mixture solution, and injecting into a DAD to obtain DAD data; then, calculating a spectral library by a quick qualitative analysis method based on a vector error algorithm to obtain a spectral error vector; determining a spectral curve of a component included in the data corresponding to the sample, according to a value of the error vector; and calculating a content flag value of each component in the sample and concentration information of each substance.

7 Claims, 3 Drawing Sheets

QUICK QUANTITATIVE ANALYSIS METHOD AND ANALYZER FOR MIXTURE BASED ON SPECTRAL INFORMATION

TECHNICAL FIELD

The present invention relates to a quick quantitative analysis method for mixture concentration information and a quick quantitative analyzer for a mixture based on spectral information.

BACKGROUND

Chromatography first appeared in 1905. After more than a century of development, chromatography has become a universal technology for mixture separation/analysis, and has been widely used in quality control and sample preparation of Chinese herbal medicine, wine, agricultural products and petroleum etc. FIG. 1 shows a schematic diagram of jointing the currently popular technology of high performance liquid chromatography (HPLC) and the device of diode array detector (DAD). In analysis, a solvent (also referred to as a mobile phase) is stored in a solvent reservoir 'a', and pressed into a chromatography column 'c' (also referred to as a stationary phase) by an infusion pump 'b'. The sample solution to be analyzed enters into an analysis system through an injector 'd', and follows the solvent through the chromatography column. Due to the difference in the residence time in the chromatography column of different substances in the solution, different substances will flow out from the end of the chromatography column successively under certain analysis conditions (solvent, chromatography column, and process control). A DAD is installed at the end of the chromatography column to detect and record the substances flowing out of the chromatography column. Based on the recorded results, an experimenter performs qualitative and quantitative analysis of the composition of the solution through a computer system e. The time (residence time) for the substances to flow out of the chromatography column under the set analysis conditions can be used as a basis for qualitative analysis. When the substances flow out, the signal strength obtained by the detector can be used as a basis for quantitative analysis.

In can be seem from FIG. 1 that the analysis of the liquid chromatography takes a long time because it takes a long time for the solution to completely flow through the chromatography column. This is also the working principle that the liquid chromatography performs separation. However, in many projects, the information of the mixture needs to be measured quickly, so that the project can be controlled in a timely manner. Previously, a method was proposed for quantitatively analyzing a specific component of a solution without passing through a chromatography column, that is, by removing the time-consuming unit of the chromatography column in FIG. 1. This method also reduces the performance requirements on the infusion pump. However, this method requires an effective analysis algorithm to strengthen the analysis.

SUMMARY

In order to overcome the shortcomings of the prior art, the present invention proposes a quick quantitative analysis method and analyzer for a mixture based on spectral information. The method directly obtains diode array detector (DAD) data without using a time-consuming chromatography column to achieve quick quantitative analysis of a specific component in a solution.

The present invention adopts the following technical solutions.

A quick quantitative analysis method for a mixture based on spectral information, including the following steps:

step S1: collecting a sample of a mixture solution, injecting into a DAD so that the detector gives DAD data D;

step S2: calculating a spectral library $S=[s_1 \ s_2 \ \ldots \ s_n]$ by a quick qualitative analysis method based on a vector error algorithm to obtain a spectral error vector $\varepsilon=[\varepsilon_1 \ \varepsilon_2 \ \ldots \ \varepsilon_n]$;

step S3: determining a spectral curve $S^*=[s^*_1 \ s^*_2 \ L \ s^*_m]$ of a component included in the data D corresponding to the sample, according to a value of the error vector $\varepsilon=[\varepsilon_1 \ \varepsilon_2 \ \ldots \ \varepsilon_m]$, where $m \ll n$;

step S4: calculating a content flag value $c=[c_1 \ c_2 \ \ldots \ c_m]$ of each component in the sample according to Formula (1):

$$\begin{bmatrix} c_1 & 0 & L & 0 \\ 0 & c_2 & L & 0 \\ M & M & O & M \\ 0 & 0 & L & c_m \end{bmatrix} = pinv(P) \times D \times pinv(S'^{*T}) \quad (1)$$

where, $P=[p \ p \ \ldots \ p]$, a vector p is the normalization of a contour of the DAD data D on a time axis, that is, a maximum value is 1; $S'^{*T}$ is a transpose of $S'^*$, $S'^*=[s'_1{}^* \ s'_2{}^* \ L \ s'_m{}^*]$; a vector $s'_i{}^*$ is the normalization of a vector $s_i{}^*$; pinv(•) is a pseudo-inverse matrix;

step S5: calculating concentration information $c_1{}^*$, (i=1, 2, L, m) of each substance by using $c_i$, (i=1, 2, L, m) in Formula (1) according to Formula (2):

$$c_i^* = \frac{a \times c_i}{\eta_i \times b} = \alpha_i \times c_i \quad (2)$$

where, a is an absorbance of the DAD data; b is a thickness of the solution; m is a molar absorptivity of an i-th substance; the coefficients a and b are inherent to the instrument; the coefficient m depends on a type of the substance (i.e. qualitative information, which can be found in a manual), so the coefficient $\alpha_i$ in Formula (2) depends only on a property of the substance itself.

In the present invention, the quantitative analysis method for a mixture based on spectral information uses the DAD to generate/obtain the DAD data automatically. The method performs the analysis and calculation based on formulas (1) and (2) to finally obtain the concentration information of each substance. In this process, the qualitative calculation is solved by a previously proposed patent, while the quantitative calculation is solved by the present patent. The quantitative calculation is solved based on the qualitative calculation.

In can be seem from FIG. 3 that a quick quantitative analyzer for a mixture based on spectral information, for implementing the quick quantitative analysis method for a mixture, includes a liquid circuit system, a DAD and a control circuit. The liquid circuit system is composed of a cleaning liquid pool (12), a sample pool (16), a detection tube (29) and a waste liquid pool (26). The liquid circuit system is interconnected through a flexible liquid tube (14) and an auxiliary gas circuit (15). A connection line between an outlet of the sample pool (16) and the waste liquid pool (26) is sequentially provided with a sample introduction solenoid valve (19), the detection tube (29), a liquid injection solenoid valve (23), a gas-liquid pump (24) and a waste liquid solenoid valve (25). The liquid injection solenoid valve (23) and the waste liquid solenoid valve (25) are used to control a flow direction of gas and liquid circuits. The gas-liquid pump (24) is used to provide power for the entire liquid circuit system. Photoelectric pair tubes (20, 22) are respectively installed on upstream and downstream sides of the detection tube (29). A light source (21) and a spectral sensor (30) are oppositely installed on upper and lower sides of the detection tube (29). An output signal of the photoelectric pair tubes and an output signal of the spectral sensor (30) are respectively connected to the control circuit. The control circuit controls and connects each solenoid valve, the light source and the gas-liquid pump (24).

The photoelectric pair tube (20) is installed on a left side of the detection tube (29) to obtain a signal of a sample flowing into the detection tube (29). The photoelectric pair tube (22) is installed on a right side of the detection tube (29) to obtain a signal of the sample flowing out of the detection tube (29). The control circuit completes coordinated control between the various components. When the sample flows through the detection tube (29), the control circuit controls the light source (21) to turn on, and reads acquired DAD data from the spectral sensor (30). After passing through the detection tube (29), the sample directly flows into the waste liquid pool (26) for temporary storage.

The present invention has the following beneficial effects.

1. The quick quantitative analysis method for a mixture based on spectral information of the present invention uses the detection tube to directly obtain the DAD data of the mixture before analysis and calculation. By removing a time-consuming chromatography column, the method quickly achieves the quantitative analysis of a specific component in the solution.

2. The quick quantitative analysis method for a mixture based on spectral information of the present invention has a simple structure, low cost, convenient use, and quickly achieves the quantitative analysis of a specific component in the solution. The detection and analysis results are accurate, reliable and timely.

DETAILED DESCRIPTION

The present invention is described in more detail below with reference to specific implementations. The following embodiments are merely intended to illustrate the present invention, rather than to limit the protection scope of the present invention. Those skilled in the art may make replacements and simple combinations with conventional technical means without departing from the protection scope of the present invention.

Embodiment 1

Figure 5:
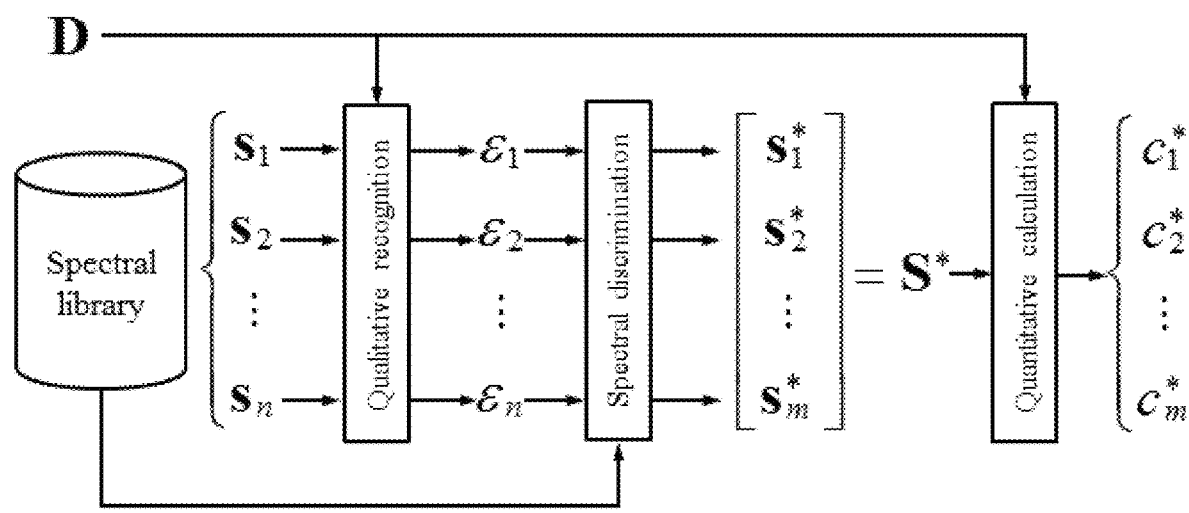
FIG. 5 is a schematic diagram of a quick quantitative analysis method according to the present invention.

The present invention provides a quick quantitative analysis method for a mixture based on spectral information, as shown in FIG. 5, including the following steps:

step S1: collect a sample of a mixture solution, inject into a DAD so that the detector gives DAD data D;

step S2: calculate a spectral library $S=[s_1\ s_2\ \ldots\ s_n]$ by a quick qualitative analysis method based on a vector error algorithm to obtain a spectral error vector $\varepsilon=[\varepsilon_1\ \varepsilon_2\ \ldots\ \varepsilon_n]$;

step S3: determine a spectral curve $S^*=[s_1^*\ s_2^*\ L\ s_m^*]$ of a component included in the data D corresponding to the sample, according to a value of the error vector $\varepsilon=[\varepsilon_1\ \varepsilon_2\ \ldots\ \varepsilon_m]$, where $m \ll n$;

step S4: calculate a content flag value $c=[c_1\ c_2\ \ldots\ c_m]$ of each component in the sample according to Formula (1):

$$\begin{bmatrix} c_1 & 0 & L & 0 \\ 0 & c_2 & L & 0 \\ M & M & O & M \\ 0 & 0 & L & c_m \end{bmatrix} = pinv(P) \times D \times pinv(S'^{*T}) \tag{1}$$

where, $P=[p\ p\ \ldots\ p]$, a vector p is the normalization of a contour of the DAD data D on a time axis, that is, a maximum value is 1; $S'^{*T}$ is a transpose of $S'^*$, $S'^*=[s'_1{}^*\ s'_2{}^*\ L\ s'_m{}^*]$; a vector $s'_i{}^*$ is the normalization of a vector $s_i{}^*$; pinv(•) is a pseudo-inverse matrix;

step S5: calculating concentration information $c_i^*$, (i=1, 2, L, n) of each substance by using $c_i$, (i=1, 2, L, m) in Formula (1) according to Formula (2):

$$c_i^* = \frac{a \times c_i}{\eta_i \times b} = \alpha_i \times c_i \tag{2}$$

where, a is an absorbance of the DAD data; b is a thickness of the solution; m is a molar absorptivity of an i-th substance; the coefficients a and b are inherent to the instrument; the coefficient $\eta_i$ depends on a type of the substance (i.e. qualitative information), so the coefficient $\alpha_i$ in Formula (2) depends only on a property of the substance itself.

In the present invention, the quantitative analysis method for a mixture based on spectral information uses the DAD to generate/obtain the DAD data automatically. The method performs the analysis and calculation based on formulas (1) and (2) to finally obtain the concentration information of each substance. In this process, the qualitative calculation is solved by a previously proposed patent, while the quantitative calculation is solved by the present patent. The quantitative calculation is solved based on the qualitative calculation.

Embodiment 2

Figure 3:
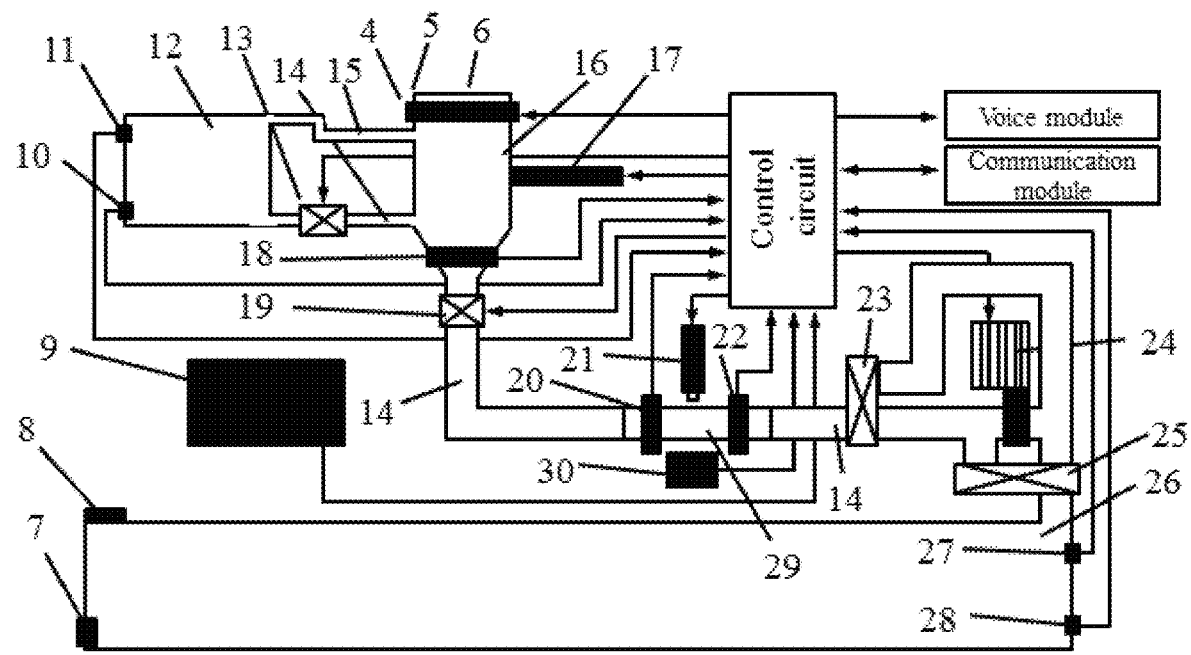
FIG. 3 is a schematic structural diagram of a quick quantitative analyzer for a mixture according to the present invention.
Figure 4:
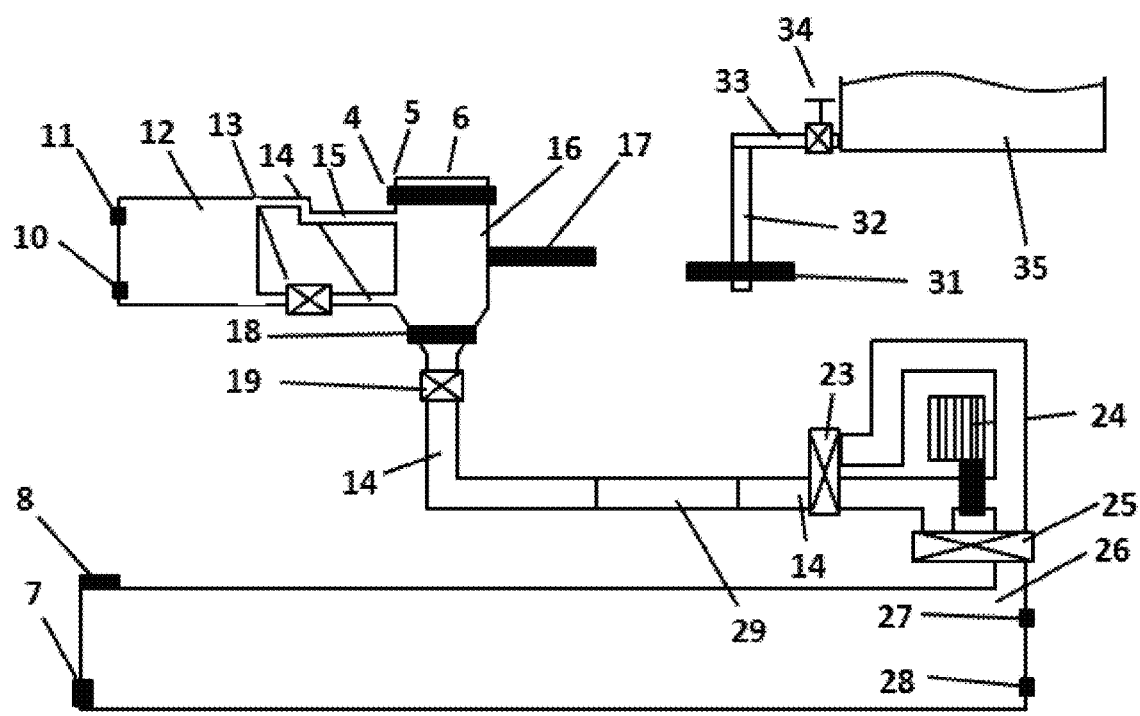
FIG. 4 is a schematic diagram of a liquid circuit system of a quick quantitative analyzer for a mixture according to the present invention.

Referring to FIG. 3 and FIG. 4, this embodiment provides a quick quantitative analyzer for a mixture based on spectral information, for implementing the above quick quantitative analysis method for a mixture, including a liquid circuit system, a DAD and a control circuit. The liquid circuit system is composed of a cleaning liquid pool 12, a sample pool 16, a detection tube 29 and a waste liquid pool 26. The liquid circuit system is interconnected through a flexible liquid tube 14 and an auxiliary gas path 15. A connection line between an outlet of the sample pool 16 and the waste liquid pool 26 is sequentially provided with a sample introduction solenoid valve 19, the detection tube 29, a liquid injection solenoid valve 23, a gas-liquid pump 24 and a waste liquid solenoid valve 25. The liquid injection solenoid valve 23 and the waste liquid solenoid valve 25 are used to control a flow direction of gas and liquid circuits. The gas-liquid pump 24 is used to provide power for the entire liquid circuit system. Photoelectric pair tubes are respectively installed on upstream and downstream sides of the detection tube 29. A light source 21 and a spectral sensor 30 (i.e. the DAD) are oppositely installed on upper and lower sides of the detection tube 29. An output signal of the photoelectric pair tubes and an output signal of the spectral sensor 30 are respectively connected to the control circuit. The control circuit controls and connects each solenoid valve, the light source and the gas-liquid pump 24.

The photoelectric pair tube 20 is installed on a left side of the detection tube 29 to obtain a signal of a sample flowing into the detection tube 29. The photoelectric pair tube 22 is installed on a right side of the detection tube 29 to obtain a signal of the sample flowing out of the detection tube 29. The control circuit completes coordinated control between the various components. When the sample flows through the detection tube 29, the control circuit controls the light source 21 to turn on, and reads acquired DAD data from the spectral sensor 30. After passing through the detection tube 29, the sample directly flows into the waste liquid pool 26 for temporary storage.

The spectral sensor 30, i.e. the DAD, uses a standard interface module to directly input the DAD data to the control circuit for calculation and analysis.

Embodiment 3

Referring to FIG. 3 and FIG. 4, this embodiment provides a quick quantitative analyzer for a mixture based on spectral information. This embodiment is different from Embodiment 1 in that: further, a communication line between the cleaning liquid pool 12 and the sample pool 16 is provided with a cleaning solenoid valve 13; a middle part of the sample pool 16 is provided with a sealing slider 17 for intercepting a gas circuit from a sample injection port 6; a self-reset button 18 is installed below the sample pool 16, and a button 5 is installed above the sample pool 16; the self-reset button 18 and the button 5 are connected to the control circuit.

The components of the gas and liquid circuits are connected through a flexible liquid tube. The use of the flexible liquid tube is convenient for installation and convenient for the flexible installation of the sample pool. A user can touch the sample pool through the button 5, thereby triggering the button 18 to generate a button signal to notify the control circuit.

In the quick quantitative analyzer for a mixture based on spectral information, the cleaning liquid pool 12 is provided with a high liquid level sensor 11 and a low liquid level sensor 10, and the control circuit obtains capacity information of a cleaning liquid through the liquid level sensors; the waste liquid pool 26 is provided with a high liquid level sensor 27 and a low liquid level sensor 28, and the control circuit obtains capacity information of a waste liquid through the liquid level sensors. An upper part of the waste liquid pool 26 is provided with a vent hole 8 to facilitate the liquid circuit system to form a gas circulation path; a lower part of the waste liquid pool 26 reserves a drain port 7 to facilitate the discharge of the waste liquid.

Embodiment 4

Figure 1:
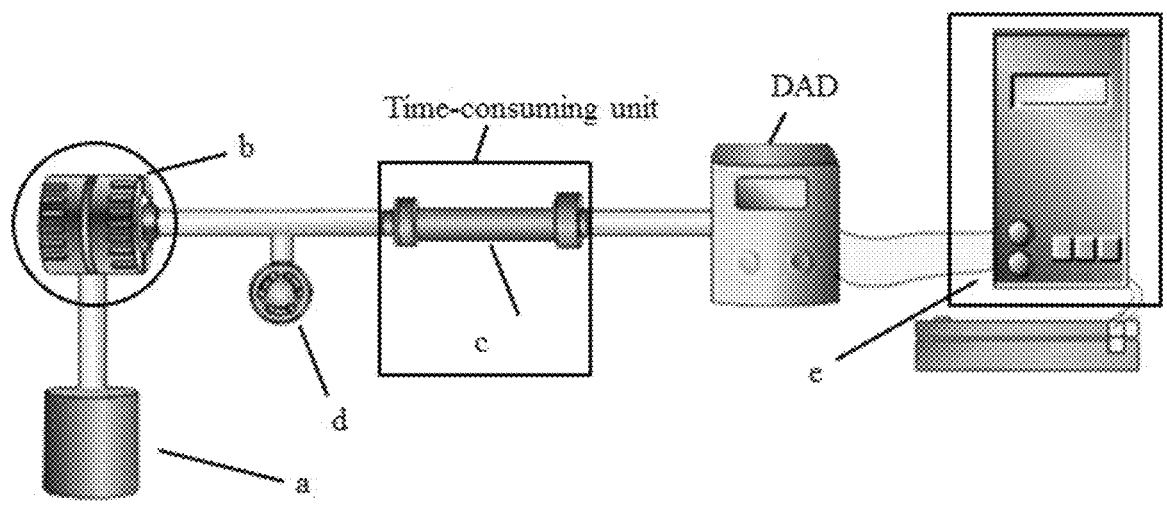
FIG. 1 is a schematic diagram showing a working principle of high performance liquid chromatography-diode array detector (HPLC-DAD) and a design scheme of the present invention.
Figure 2:
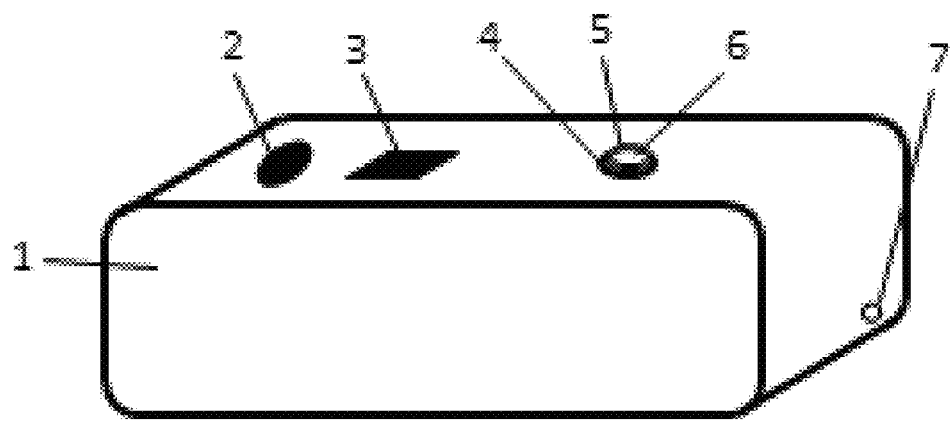
FIG. 2 is an external view of a quick quantitative analyzer for a mixture according to the present invention.

The present invention provides a quick quantitative analysis analyzer for a mixture based on spectral information, having an appearance as shown in FIG. 2. A housing 1 of the entire analyzer is composed of a cube. The entire analyzer outputs voice status information through a speaker 2. The user can use a mobile phone to scan a quick response code 3 to download a mobile application (APP). The analyzer feeds back optical status information (see Table 1 for a specific status) of the analyzer to the user through a two-color (white and red) light-emitting diode (LED) ring 4. The user can realize start-up, shutdown and necessary user input through the button 5 (a function of the button 5 is shown in Table 2). The user injects a sample to be detected into the analyzer through the sample injection port 6. When the waste liquid in the analyzer reaches a certain amount, the user can discharge the waste liquid through the drain port 7. In a laboratory environment, the user can also install a drain pipe at the drain port 7 to directly discharge the waste liquid each time an experiment is performed.

TABLE 1

LED status and description

| SN | LED Status | Description of Status |
|---|---|---|
| 1 | White flashes slowly | The system is self-testing. |
| 2 | White steady on | The analyzer passes the self-test and is idle. |
| 3 | White flashes quickly | The analyzer is in an analysis mode. |
| 4 | Red flashes slowly | The analyzer fails the self-test and issues a voice prompt through a voice module to a part that fails the self-test. |
| 5 | Red steady on | The analyzer malfunctions during operation and issues a voice prompt through the voice module. |
| 6 | Red flashes quickly | The waste liquid pool is full, and a voice prompt is issued through the voice module. |
| 7 | Yellow (red and white on at the same time) | Low battery |

TABLE 2

Description of button functions

| SN | LED Status | Description of Status |
|---|---|---|
| 1 | Click under a shutdown state | The system is powered on and enters self-test. |
| 2 | Click with white light on | A sample detection function is started, and a voice prompt is continuously issued through the voice module. |
| 3 | Double-click with white light on | The analyzer starts to connect a network and issues a voice prompt through the voice module. Now, the user needs to set a network parameter of the analyzer through the APP on the mobile phone. |

TABLE 2-continued

Description of button functions

| SN | LED Status | Description of Status |
|---|---|---|
| 4 | Long press with white light on | If the system is currently idle, it will shut down directly; if it is currently in a sample detection state, it will shut down after completing the current operation; if it is currently in a cleaning liquid filling state, it will stop filling and issue a voice prompt, and then shut down. |
| 5 | Click while red flashes slowly | The analyzer retests itself. |
| 6 | Click while red steady on | The analyzer reports an error type and a corrective action through the voice module. |
| 7 | Click while yellow steady on | If the system is currently idle, it will shut down directly; if it is currently in a sample detection state, it will shut down after completing the current operation; if it is currently in a cleaning liquid filling state, it will stop filling and issue a voice prompt, and then shut down. |

FIG. 3 and FIG. 4 show an internal structure of the quick quantitative analyzer. A cleaning liquid pool 12, a sample pool 16, a detection tube 29 and a waste liquid pool 26 compose a liquid circuit system of the analyzer. The liquid circuit system is interconnected through a flexible liquid tube 14 and an auxiliary gas circuit 15. A cleaning solenoid valve 13, a sample introduction solenoid valve 19, a liquid injection solenoid valve 23 and a waste liquid solenoid valve 25 are used to control a flow direction of gas and liquid circuits. A gas-liquid pump 24 is used to provide power for the entire liquid circuit system. The cleaning liquid pool 12 stores a cleaning liquid for cleaning the entire liquid system to wait for a next detection. The sample to be detected is injected into the sample pool 16 through the sample injection port 6 and waits for detecting there. When the sample flows through the detection tube 29, a control circuit controls a light source 21 to turn on, and reads acquired DAD data from a spectral sensor 30. After passing through the detection tube 29, the sample directly flows into the waste liquid pool 26 for temporary storage. An upper part of the waste liquid pool 26 is provided with a vent hole 8 to facilitate the liquid circuit system to form a gas circulation path; a lower part of the waste liquid pool 26 reserves a drain port 7 to facilitate the discharge of the waste liquid.

The cleaning liquid pool 12 is provided with a high liquid level sensor 11 and a low liquid level sensor 10 for providing capacity information of the cleaning liquid. The waste liquid pool 26 is provided with a high liquid level sensor 27 and a low liquid level sensor 28 for providing capacity information of the waste liquid. A middle part of the sample pool 16 is provided with a sealing slider 17 for intercepting a gas circuit from the sample injection port 6. A photoelectric pair tube 20 is installed on a left side of the detection tube 29 to obtain a signal of the sample flowing into the detection tube 29. A photoelectric pair tube 22 is installed on a right side of the detection tube 29 to obtain a signal of the sample flowing out of the detection tube 29. The control circuit completes coordinated control between the various components. The voice module outputs voice prompt information. A communication module realizes Bluetooth and WiFi communication. A battery 9 powers the entire analyzer.

The main workflow of the analyzer includes: sample detection, liquid circuit cleaning, and filling with the cleaning liquid. These processes are described in detail below with reference to FIG. 3 and FIG. 4.

(1) Sample detection. When the analyzer is idle, the cleaning solenoid valve 13 and the sample introduction solenoid valve 19 are closed. A lower side line of the three-way liquid injection solenoid valve 23 is opened, and an upper side line is closed; a right side line of the three-way waste liquid solenoid valve 25 is opened, and a left side line is closed. When the white LED light steady on, the user injects the sample to be detected into the sample pool 16 through the sample injection port 6. The user clicks the button 5 to start sample detection. The control circuit activates the gas-liquid pump 24 and opens the sample introduction solenoid valve 19. The sample flows in the liquid circuit system at a certain rate. When the sample passes through the photoelectric pair tube 20, the control circuit turns on the light source 21 and drives the spectral sensor 30 to acquire data. After the sample totally passes through the photoelectric pair tube 22, the control circuit turns off the light source 21 and the spectral sensor 30. The gas-liquid pump 24 continues to work for 10 s, so that the sample flows into the waste liquid pool 26.

(2) Liquid circuit cleaning. The liquid circuit needs to be cleaned each time after a sample is detected. When the liquid circuit is cleaned, the control circuit drives the sealing slider 17 to intercept the gas circuit from the sample injection port 6. Then the cleaning solenoid valve 13 and the sample introduction solenoid valve 19 are opened. The lower side line of the three-way liquid injection solenoid valve 23 is opened, and the upper side line is closed; the right side line of the three-way waste liquid solenoid valve 25 is opened, and the left side line is closed. At the same time, the gas-liquid pump is started to work. Thus, the atmospheric pressure passes through the auxiliary gas circuit 15 to push the cleaning liquid into the gas and liquid circuits to complete the cleaning work of the gas and liquid circuits.

(3) Filling with the cleaning liquid. The filling process of the cleaning liquid needs to be started through the mobile phone APP. The principle is shown in FIG. 4. The cleaning liquid is stored in a container 35. A manual valve 34 is installed at a lower left side of the container to control the outflow of the cleaning liquid. The valve 34 is connected to a liquid injection probe 32 through a flexible hose 33. A lower end of the injection probe 32 is provided with a sealing gasket. The container 35 is kept higher than the sample injection port 6 when the liquid is injected. Then the liquid injection probe 32 is inserted into the sample pool 16 to be lower than the auxiliary gas circuit 15. The control circuit opens the cleaning solenoid valve 13 and the sample introduction solenoid valve 19. The upper side line of the three-way liquid injection solenoid valve 23 is opened, and the lower side line is closed; the left side line of the three-way waste liquid solenoid valve 25 is opened, and the right side line is closed. At this time, a gas path is formed from the vent hole 8 to the left side line of the waste liquid solenoid valve 25, to the upper side line of the liquid injection solenoid valve 23, to the sample introduction solenoid valve 19, to the cleaning solenoid valve 13, and to the auxiliary gas circuit 15. The control circuit activates the gas-liquid pump 24 and opens the valve 34. The cleaning liquid is injected into the cleaning liquid pool 12 from the above-mentioned gas path. When the upper liquid level sensor 11 receives a signal, the gas-liquid pump is stopped, and the cleaning solenoid valve 13 and the sample introduction solenoid valve 19 are closed, thereby completing the filling of the cleaning liquid.

FIG. 5 shows a principle of a quick quantitative analysis method. D is DAD data obtained by the above-mentioned analyzer. $s_i$, (i=1, 2, L, n) is a spectral curve in a standard spectral library. A qualitative recognition method (content of a different patent) calculates an error of each spectral curve in the DAD data D to obtain an error $\varepsilon_i$, (i=1, 2, ..., n). Each spectral curve exists in the DAD data D is determined according to the error of the spectral curve.

As shown in FIG. 5, if it is determined that $s_i^*$, (i=1, 2, L, m) exists in the DAD data D, a content flag value $c_i$, (i=1, 2, L, m) of each substance is calculated according to a quantitative algorithm shown in Formula (1).

$$\begin{bmatrix} c_1 & 0 & L & 0 \\ 0 & c_2 & L & 0 \\ M & M & O & M \\ 0 & 0 & L & c_m \end{bmatrix} = pinv(P) \times D \times pinv(S'^{*T}) \quad (1)$$

where, P=[p p ... p], a vector p is the normalization of a contour of the DAD data D on a time axis, that is, a maximum value is 1; $S'^{*T}$ is a transpose of $S'^*$, $S'^*=[s'_1{}^* \; s'_2{}^* \; L \; s'_m{}^*]$; a vector $s'_i{}^*$ is the normalization of a vector $s_i^*$; pinv(•) is a pseudo-inverse matrix; concentration information $c_i^*$, (i=1, 2, L, m) of each substance is calculated by using $c_i$, (i=1, 2, L, m) in Formula (1) according to Formula (2):

$$c_i^* = \frac{a \times c_i}{\eta_i \times b} = \alpha_i \times c_i \quad (2)$$

In the formula, a is an absorbance of the DAD data; b is a thickness of the solution; m is a molar absorptivity of an i-th substance. The coefficients a and b are inherent to the instrument; the coefficient m depends on a type of the substance (i.e. qualitative information). Therefore, the coefficient $\alpha_i$ in Formula (2) depends only on a property of the substance itself

What is claimed is:

1. A quick quantitative analysis method for a mixture based on spectral information, comprising the following steps:
step S1: obtaining diode array detector (DAD) data D by a DAD, wherein the DAD data D are directly output from the DAD to a control circuit;
step S2: by the control circuit, calculating a spectral library S=[$s_1 \; s_2 \; ... \; s_n$] by a quick qualitative analysis method based on a vector error algorithm to obtain a spectral error vector $\varepsilon$=[$\varepsilon_1 \; \varepsilon_2 \; ... \; \varepsilon_n$];
step S3: determining a spectral curve $S^*$=[$s_1^* \; s_2^* \; L \; s_m^*$] of a component comprised in the data D corresponding to a sample of a mixture solution, by the control circuit, according to a value of the error vector $\varepsilon$=[$\varepsilon_1 \; \varepsilon_2 \; ... \; \varepsilon_m$], wherein m<<n;
step S4: calculating a content flag value c=[$c_1 \; c_2 \; ... \; c_m$] of each component in the sample by the control circuit according to Formula (1);

$$\begin{bmatrix} c_1 & 0 & L & 0 \\ 0 & c_2 & L & 0 \\ M & M & O & M \\ 0 & 0 & L & c_m \end{bmatrix} = pinv(P) \times D \times pinv(S'^{*T}) \quad (1)$$

wherein, P=[p p ... p], a vector p is the normalization of a contour of the DAD data D on a time axis, that is, a maximum value is 1; $S'^{*T}$ is a transpose of $S'^*$, $S'^*=[s'_1{}^* \; s'_2{}^* \; L \; s'_m{}^*]$; a vector $s'_i{}^*$ is the normalization of a vector $s_i^*$; pinv(•) is a pseudo-inverse matrix; and step S5: calculating concentration information $c_i^*$, (i=1, 2, L, n) of each substance by using $c_i$, (i=1, 2, L, m) in Formula (1) by the control circuit according to Formula (2):

$$c_i^* = \frac{a \times c_i}{\eta_i \times b} = \alpha_i \times c_i \quad (2)$$

wherein, a is an absorbance of the DAD data; b is a thickness of the solution; $\eta_i$ is a molar absorptivity of an i-th substance; the coefficients a and b are inherent to the instrument; the coefficient $\eta_i$ depends on a type of the substance, so the coefficient $\alpha_i$ in Formula (2) depends only on a property of the substance itself.

2. A quick quantitative analyzer for a mixture based on spectral information comprising
a liquid circuit system, a DAD and a control circuit, wherein the liquid circuit system is composed of a cleaning liquid pool (12), a sample pool (16), a detection tube (29) and a waste liquid pool (26); the liquid circuit system is interconnected through a flexible liquid tube (14) and an auxiliary gas circuit (15); a connection line between an outlet of the sample pool (16) and the waste liquid pool (26) is sequentially provided with a sample introduction solenoid valve (19), the detection tube (29), a liquid injection solenoid valve (23), a gas-liquid pump (24) and a waste liquid solenoid valve (25); the liquid injection solenoid valve (23) and the waste liquid solenoid valve (25) are used to control a flow direction of gas and liquid circuits; the gas-liquid pump (24) is used to provide power for the entire liquid circuit system; photoelectric pair tubes (20, 22) are respectively installed on upstream and downstream sides of the detection tube (29); a light source (21) and a spectral sensor (30) are oppositely installed on upper and lower sides of the detection tube (29); an output signal of the photoelectric pair tubes and an output signal of the spectral sensor (30) are respectively connected to the control circuit; the control circuit controls and connects each solenoid valve, the light source and the gas-liquid pump (24);
wherein the DAD is configured to obtain DAD data D and directly output the DAD data D to the control circuit; and
the control circuit is configured to:
calculate a spectral library S=[$s_1 \; s_2 \; ... \; s_n$] by a quick qualitative analysis method based on a vector error algorithm to obtain a spectral error vector $\varepsilon$=[$\varepsilon_1 \; \varepsilon_2 \; ... \; \varepsilon_n$];
determine a spectral curve $S^*$=[$s_1^* \; s_2^* \; L \; s_m^*$] of a component comprised in the data D corresponding to a sample of mixture solution, according to a value of the error vector $\varepsilon$=[$\varepsilon_1 \; \varepsilon_2 \; ... \; \varepsilon_m$], wherein m<<n;
calculate a content flag value c=[$c_1 \; c_2 \; ... \; c_m$] of each component in the sample according to Formula (1);

$$\begin{bmatrix} c_1 & 0 & L & 0 \\ 0 & c_2 & L & 0 \\ M & M & O & M \\ 0 & 0 & L & c_m \end{bmatrix} = pinv(P) \times D \times pinv(S'^{*T}) \quad (1)$$

wherein, P=[p p . . . p], a vector p is the normalization of a contour of the DAD data D on a time axis, that is, a maximum value is 1; $S'^{*T}$ is a transpose of $S'^*$, $S'^* = [s'_1{}^* \ s'_2{}^* \ L \ s'_m{}^*]$; a vector $s_i'^*$ is the normalization of a vector $s_i^*$; pinv(•) is a pseudo-inverse matrix; and calculate concentration information $c_i^*$, (i=1, 2, L, n) of each substance by using $c_i$, (i=1, 2, L, m) in Formula (1) according to Formula (2):

$$c_i^* = \frac{a \times c_i}{\eta_i \times b} = \alpha_i \times c_i \qquad (2)$$

wherein, a is an absorbance of the DAD data; b is a thickness of the solution; $\eta_i$ is a molar absorptivity of an i-th substance; the coefficients a and b are inherent to the instrument the coefficient $\eta_i$ depends on a type of the substance, so the coefficient a, in Formula (2) depends only on a property of the substance itself.

3. The quick quantitative analyzer for a mixture based on spectral information according to claim 2, wherein a communication line between the cleaning liquid pool (12) and the sample pool (16) is provided with a cleaning solenoid valve (13); a middle part of the sample pool (16) is provided with a sealing slider (17) for intercepting a gas circuit from a sample injection port (6); a self-reset button (18) is installed below the sample pool (16), and a button (5) is installed above the sample pool (16); the self-reset button (18) and the button (5) are connected to the control circuit.

4. The quick quantitative analyzer for a mixture based on spectral information according to claim 3, wherein the cleaning liquid pool (12) is provided with a high liquid level sensor (11) and a low liquid level sensor (10), and the control circuit obtains capacity information of a cleaning liquid through the liquid level sensors; the waste liquid pool (26) is provided with a high liquid level sensor (27) and a low liquid level sensor (28), and the control circuit obtains capacity information of a waste liquid through the liquid level sensors.

5. The quick quantitative analyzer for a mixture based on spectral information according to claim 4, wherein an upper part of the waste liquid pool (26) is provided with a vent hole 8 to facilitate the liquid circuit system to form a gas circulation path; a lower part of the waste liquid pool (26) reserves a drain port (7) to facilitate the discharge of the waste liquid.

6. The quick quantitative analyzer for a mixture based on spectral information according to claim 2, wherein the cleaning liquid pool (12) is provided with a high liquid level sensor (11) and a low liquid level sensor (10), and the control circuit obtains capacity information of a cleaning liquid through the liquid level sensors; the waste liquid pool (26) is provided with a high liquid level sensor (27) and a low liquid level sensor (28), and the control circuit obtains capacity information of a waste liquid through the liquid level sensors.

7. The quick quantitative analyzer for a mixture based on spectral information according to claim 6, wherein an upper part of the waste liquid pool (26) is provided with a vent hole (8) to facilitate the liquid circuit system to form a gas circulation path; a lower part of the waste liquid pool (26) reserves a drain port (7) to facilitate the discharge of the waste liquid.

* * * * *